United States Patent [19]

Geislinger

[11] 4,173,158
[45] Nov. 6, 1979

[54] TUNED ABSORBER FOR TORSIONAL VIBRATIONS WITH HYDROSTATIC DAMPING

[76] Inventor: Leonhard Geislinger, Höfelgasse 26, Salzburg, Austria

[21] Appl. No.: 760,430

[22] Filed: Jan. 18, 1977

[30] Foreign Application Priority Data

Jan. 23, 1976 [AT] Austria ..................... 438/76

[51] Int. Cl.² ............... F16F 15/00; F16D 63/00
[52] U.S. Cl. ........................ 74/574; 188/1 B; 248/562
[58] Field of Search ............... 74/573, 573 F, 574; 73/66, 455, 457, 458; 64/1 V; 415/104, 107; 308/26; 248/20, 8, 7, 21, 22, 15, 18, 24, 358 R, 358 AA; 188/1 B, 1 B X; 416/144, 145; 308/146, 147

[56] References Cited

U.S. PATENT DOCUMENTS

| | | | |
|---|---|---|---|
| 933,076 | 9/1909 | Houdaille | 74/574 X |
| 2,356,605 | 8/1944 | Meininghaus | 416/500 |
| 2,738,660 | 3/1956 | Gail | 64/1 V |
| 2,998,868 | 9/1961 | Meier | 74/574 X |
| 3,203,273 | 8/1965 | Favrot | 74/573 |
| 3,224,296 | 12/1965 | Civelli | 74/573 |
| 3,248,967 | 5/1966 | Lewis | 74/573 X |
| 3,641,839 | 2/1972 | Greely | 74/574 |
| 3,812,724 | 5/1974 | Curtz et al. | 74/573 X |
| 3,847,453 | 11/1974 | Herbert | 308/26 X |

Primary Examiner—Samuel Scott
Assistant Examiner—Don E. Ferrell
Attorney, Agent, or Firm—Kurt Kelman

[57] ABSTRACT

A tuned absorber for torsional vibrations with hydrostatic damping comprises relatively rotatable outer and inner members defining primary chambers therebetween, a damping liquid in the primary chambers, springs or gas cushions arranged in secondary chambers to exert no torque on the outer and inner members, and connections between the chambers for permitting liquid to flow from the primary chambers to the secondary chambers for applying liquid pressure to the springs or gas cushions in the secondary chambers.

7 Claims, 6 Drawing Figures

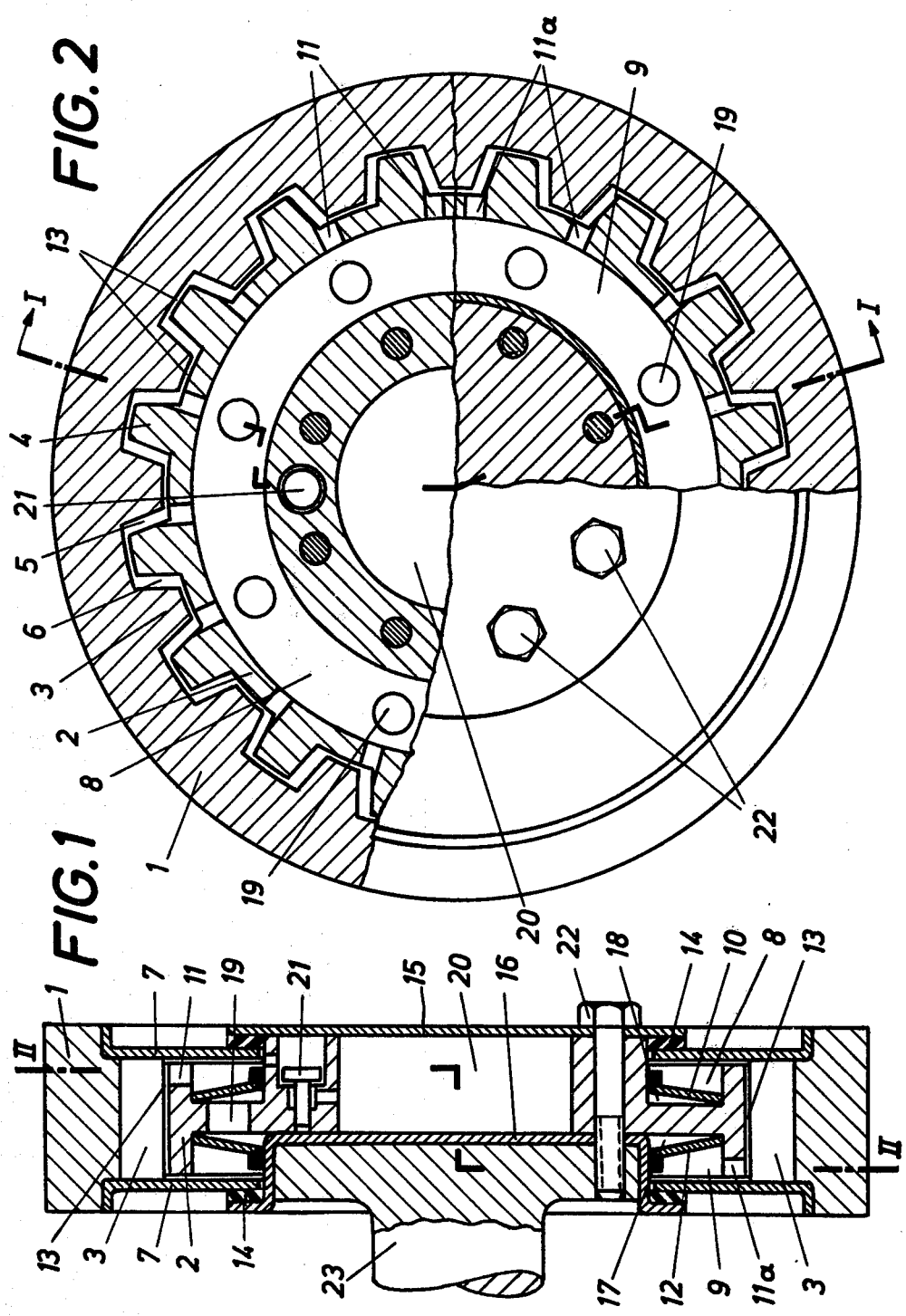

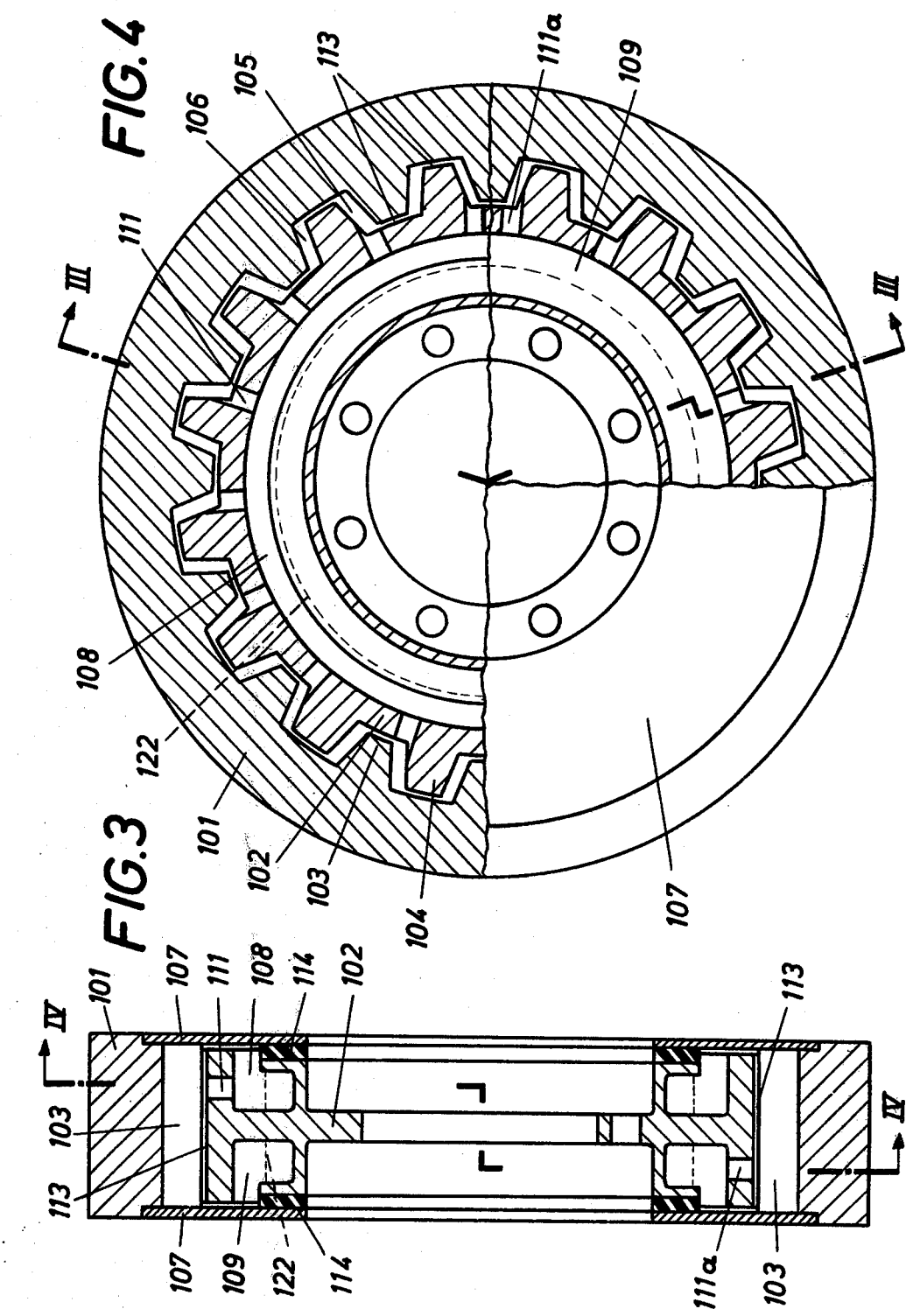

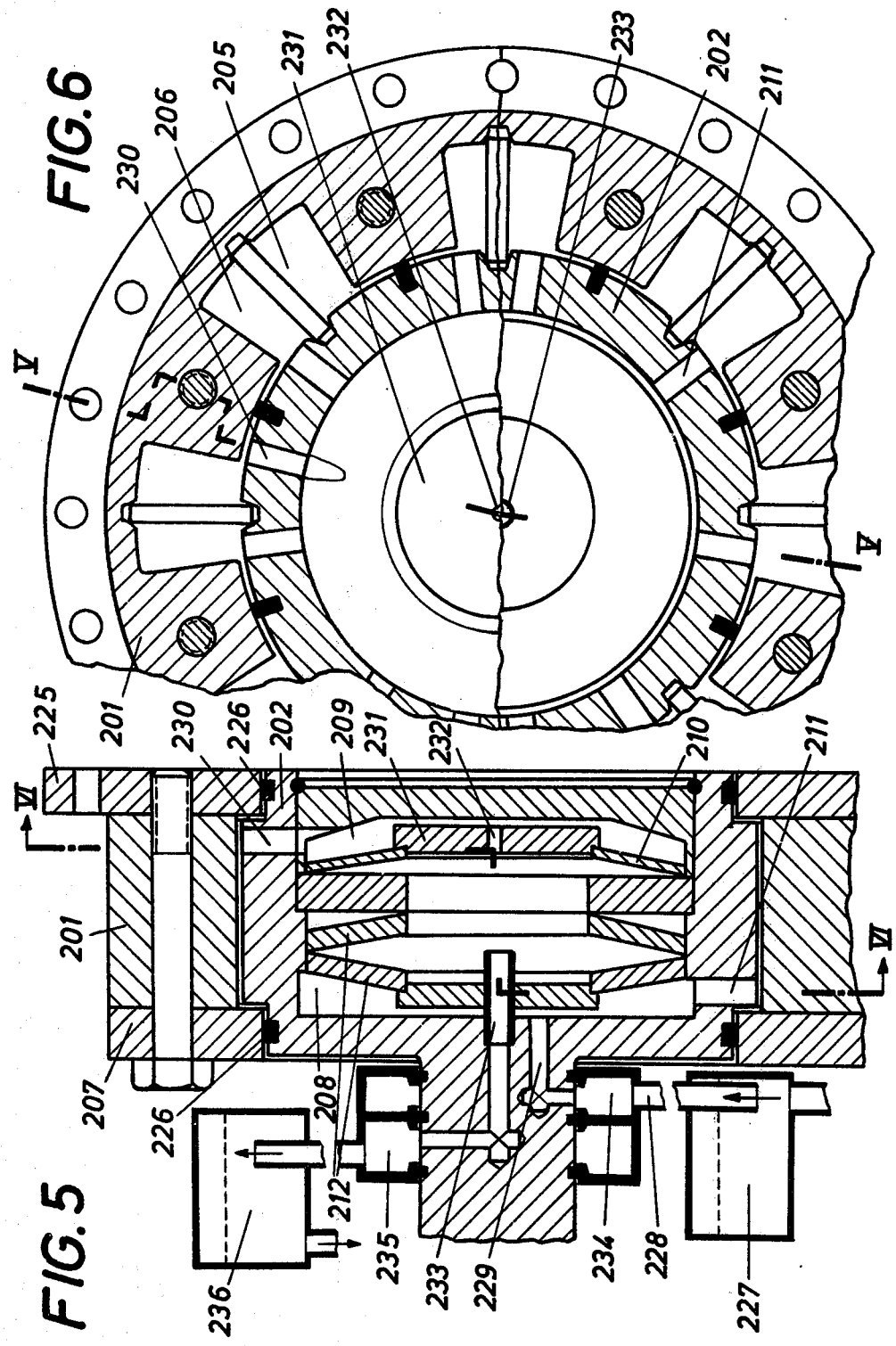

TUNED ABSORBER FOR TORSIONAL VIBRATIONS WITH HYDROSTATIC DAMPING

This invention relates to a tuned absorber for torsional vibrations with hydrostatic damping, which comprises resilient means and liquid-filled chambers between inner and outer members of the absorber.

It has been known for a long time substantially to improve the action of a mechanism for damping torsional vibrations, for a given flywheel effect of the outer member, by the use of suitably selected springs between the outer and inner members. In known embodiments, the outer and inner members are provided with meshing toothlike portions to define oil-filled chambers, and a relative movement of the outer and inner members causes the oil to be displaced so as to produce a damping action (German Pat. No. 748,416). It is also known to provide a resilient coupling consisting of rubber seals between the outer and inner members. A fluid-controlled damping mechanism which comprises a reservoir that is disposed radially inwardly of the chambers and filled with gas is also known (German Pat. No. 974,310).

For an optimum action of a damping mechanism which comprises a resilient coupling and serves to damp torsional vibrations, coupling springs having a certain stiffness are required as well as an optimum damping effect. In the known damping mechanisms it is not possible in practice to maintain the stiffness and the damping effect constant with sufficient accuracy because these two parameters vary with temperature and/or as a result of ageing.

Besides, it has proved extremely difficult to provide a rubber spring which has such dimensions that an optimum stiffness is achieved in conjunction with the shear stress of the rubber which is as low as is required for a sufficiently long life. In this respect it is particularly undesirable that all known kinds of rubber tend to age and to change in stiffness.

Other known damping mechanisms for damping torsional vibrations comprise a resilient coupling which comprises leaf springs of steel. Whereas such couplings do not age, these damping mechanisms are composite, expensive structures.

It is an object of the invention to eliminate these disadvantages and to provide a damping and/or coupling mechanism which serves to damp torsional vibrations and is of the kind defined first hereinbefore and the performance of which is independent of temperature and changes only slightly with time.

This object is essentially accomplished according to the invention by resilient means disposed in secondary chambers which communicate with the liquid-filled chambers. The liquid pressure in the liquid-filled chambers acts on the resilient means.

In an advantageous embodiment of the invention, the inner member of the damping and/or coupling mechanisms defines two separate secondary chambers, which are disposed radially inwardly of the liquid-filled chambers and contain the resilient means, and passages connect one of the secondary chambers to those of the liquid-filled chambers which decrease in volume during a relative movement between the inner and outer members in a predetermined sense, and connect the other secondary chambers with those of the liquid-filled chambers which increase in volume during such movement.

The resilient means may consist of disc springs or gas cushions.

In a particularly simple embodiment of the invention, both secondary chambers are filled in part with gas. In that case, a relative movement of the outer and inner members results in a compression of the gas in one secondary chamber and in a pressure relief of the gas in the other secondary chamber. The stiffness of such a pneumatic spring depends, inter alia, on the volume and on the pressure of the gas. As the gas pressure can easily be changed, an optimum stiffness can be obtained without difficulty. Theoretical investigations have shown that best results will be obtained if the stiffness is adjusted in dependence on the speed of the system to be damped. This is accomplished in accordance with the invention in that one or both secondary chambers communicate through capillary bores with a reservoir, to which a suitable pressure is applied from a stationary source by means of a rotary fitting.

In a particularly desirable arrangement, the secondary chambers which contain the resilient means are defined by stationary containers, which are connected to the liquid-filled chambers by conduits and rotary fittings. As the liquid-filled chambers increase or decrease in volume, the liquid pressure in the liquid-filled chambers is transmitted outwardly via two reservoirs and two rotary fittings to the stationary containers and in the latter is applied to the resilient means consisting of mechanical or pneumatic springs.

This arrangement, in which resilient means are accommodated at least in part in a stationary part of the mechanism, is particulary suitable as a torsionally elastic coupling mechanism for transmitting torque and for damping torsional vibrations. The advantages which are afforded in this case compared to the previously known coupling mechanisms reside in that the dimensions of the springs are not limited by space restrictions because the resilient means are accommodated in the stationary part and in that a very high elasticity can be obtained, furthermore, in that the elasticity can be changed during operation, and in that adjustable throttles can be incorporated in the passages leading from the stationary containers to the rotary fittings so that the damping effect of the coupling mechanism can also be adjusted during operation. The change of the elasticity and damping effect during operation, e.g., in dependence on speed, permits of an adjustment of optimum values for every condition of operation.

When it is desired to transmit torque which has an average that is constant with time, the inner and outer members of the coupling mechanism should assume a predetermined angular position relative to each other. This can be accomplished in accordance with the invention by providing one or more of the liquid-filled chambers with an oil drain bore which is increasingly opened in response to an increase of the relative angular displacement of the inner and outer members. This feature permits of an automatic control of the pressure required to transmit a certain torque.

It will be desirable to provide the bores and/or passages which connect the reservoir to the secondary chambers or which connect the secondary chambers to the liquid-filled chambers with flow control means which present a lower resistance to the flow of liquid toward the liquid-filled chambers than to a flow of liquid in the opposite direction so that it is possible to maintain in the liquid-filled chambers a higher pressure than in the reservoir and/or the secondary chambers.

The fact that the pressure in the liquid-filled chambers is hydraulically transmitted to the resilient means results in unexpected advantages regarding the damping effect. For a given moment of inertia of the outer means, i.e., for a given size of the damping mechanism, the peak amplitudes of the oscillations of the system to be damped lie at higher frequencies so that the provision of the damping mechanism according to the invention does not result in a decrease of the critical speeds, as is the case with the previously known damping mechanisms.

The invention is illustrated by way of example on the accompanying drawings, in which FIGS. 1 and 2 are sectional views taken on line I—I in FIG. 2 and on line II—II in FIG. 1, respectively, and showing a damping mechanism according to the invention which serves to damp torsional vibrations and comprises disc springs, FIGS. 3 and 4 are sectional views taken on line III—III in FIG. 4 and on line IV—IV in FIG. 3, respectively, and showing an embodiment comprising a pneumatic spring, and FIGS. 5 and 6 are sectional views taken on line V—V in FIG. 6 and on line VI—VI in FIG. 5, respectively, and showing a vibration-damping torsionally elastic coupling mechanism according to the invention.

In the embodiment shown in FIGS. 1 and 2, the damping mechanism comprises an annular outer member 1, which owing to its flywheel effect constitutes the active mass of the damping mechanism and is provided at its inside periphery with teeth 3 which extend into spaces between teeth 4 formed on an inner member 2. Oil-filled chambers 5, 6 are thus defined, which are closed at their ends by cover plates 7. Two secondary chambers 8, 9 are disposed radially inwardly of the oil-filled chambers and contain disc springs 10, 12. The secondary chamber 8 communicates through bores 11 with the oil-filled chambers 5, and the secondary chamber 9 communicates through bores 11a with the oil-filled chambers 6. During a movement of the inner member 2 relative to the outer member 1, e.g., in the clockwise sense, part of the oil in the chambers 5 is displaced through the bores 11 into the secondary chamber 8 to apply pressure to the disc spring 10. On the other hand, the volume of the oil-filled chambers 6 is increased so that oil flows from the secondary chamber 9 through the bores 11a into the oil-filled chambers 6 and the disc spring 12 is relieved from pressure. Part of the oil which has been displaced in the oil-filled chambers 5 flows into the oil-filled chambers 6 through the gaps 13 between the inner member 2 and the outer member 1.

Rubber rings 14 vulcanization-bonded between the cover plates 7 and the end plates 15, 16 seal the damping mechanism to prevent an escape of oil toward the outside. The cover plates 7 and the end plates 14, 15 are air-tightly adhesively bonded to the outer member 1 and the inner member 2, respectively. The disc springs 10, 12 are oil-tightly sealed and define separate compartments 18 and 17 in the respective secondary chambers 8 and 9. A relative movement between the outer member 1 and inner member 2 stresses the disc spring 10 and relieves the disc spring 12 so that the compartment 18 decreases and the compartment 17 increases in size to the same extent. The two compartments communicate with each other through bores 19 and communicate through capillary bores, not shown, with a reservoir 20 which is disposed radially inwardly of the secondary chambers 8, 9. The reservoir communicates through a check valve 21 with the main part of the secondary chamber 8. The above-described relative movement of the outer and inner members results in a pumping action, which causes the pressure in the oil-filled chambers 5, 6 and in the main parts of the secondary chambers 8, 9 to be always higher than the pressure in the reservoir 20. Besides, the check valve 21 and the capillary bores cause the pressure in the compartments 17, 18 to be lower than the pressure in the main parts of the secondary chambers 8, 9.

The damping mechanism is connected by screws 22 to a shaft 23 of the system to be damped.

A relative movement of the outer and inner members results in a shearing stress on the rubber rings 14 so that they transmit part of the torque and yield in response to the pulsating oil pressure like the cover plates 7. The oil is compressible too. All these elements contribute to the elasticity of the damping mechanism and their share in the total elasticity can be varied within wide limits by the designer.

The damping mechanism shown in FIGS. 1 and 2 can suitably be supplied with oil from the outside, e.g., bore in a shaft 23. In that case the rubber rings 14 may be omitted entirely or be replaced by simple O-rings.

A damping mechanism according to the invention which serves to damp torsional vibrations and comprises a pneumatic spring is shown in FIGS. 3 and 4, in which elements 101 to 109 and 111, 111a, 113, and 114, respectively, correspond to elements 1 to 9 and 11, 11a, 13 and 14 of the preceding embodiment. The secondary chambers 108 and 109 are filled in part with oil and in part with gas. During a rotation of the damping mechanism in a mean position, the annular secondary chambers are filled with gas within the dotted line 122. By a movement of the inner member 102 relative to the outer member 101, e.g., in a clockwise sense, oil is displaced from the oil-filled chambers 105 through the bores 111 into the secondary chamber 108 and the gas in the latter is compressed. The volume of the oil-filled chambers 106 is increased. Oil flows from the secondary chamber 109 through the bores 111a into the oil-filled chambers 106 and the gas in the secondary chamber expands.

Because the stiffness of the pneumatic spring depends, inter alia, on its volume and the mean gas pressure, the stiffness can easily be changed. This change can even be effected during operation if the gas is supplied to the damping mechanism through a rotary fitting.

A vibration-damping and torsionally elastic coupling mechanism according to the invention is shown in FIGS. 5 and 6. In this coupling mechanism, torque is transmitted from the inner member 202 through oil-filled chambers 205, 206 to an outer member 201, to which a flange 225 is screw-connected. The flange is connected in turn, to a machine to be driven. The outer member 201 is sealed from the outside by means of a cover plate 207, the flange 225, and O-rings 226. The oil-filled chambers 205 are supplied with oil under pressure, e.g., from a gear pump, not shown, through a container 227, a conduit 228, a rotary fitting 234, bores 229, a secondary chamber 208, and bores 211. A pressure which corresponds to the mean torque is automatically maintained by means of the control bore 230. Oil at the controlled rate flows through a secondary chamber 209, a bore 232 in plate 231, a tube 233 and a rotary fitting 235 and a container 236 into an oil pump, not shown.

During a movement of the outer member 201 relative to the inner member 202, e.g., in a counterclockwise sense, oil is displaced from the oil-filled chambers 205 into the secondary chamber 208 and further into the container 227. The pressure in the secondary chamber 208 and in the container 227 rises so that the disc springs 212 contained in the secondary chamber 208 and the gas in the container 227 are compressed. In a mean position, the container 227 is filled with gas, e.g., to the dotted line. As the pressure rises in the secondary chamber 208 and the container 227, the pressure applied to the disc spring 210 contained in the secondary chamber 209 and the pressure in the container 236 decrease because the oil-filled chambers 206 which communicate with the secondary chamber 209 and the container 236 increase in volume.

In the embodiment shown, the elasticity of the coupling mechanism depends mainly on the dimensions of the disc springs 210, 212 and on the volume and pressure of the gas enclosed in containers 227 and 236 and the contributions of these resilient means to the total elasticity may be selected as desired. Either the disc springs or the air cushions in containers 227 and 236 may be omitted. The elasticity of the coupling mechanism may easily be changed even during operation by a control of the gas pressure in the containers.

What is claimed is:

1. A tuned absorber for torsional vibrations with hydrostatic damping, which comprises
   (a) an outer member,
   (b) an inner member,
       (1) the outer and inner members being rotatable relative to each other, and
       (2) the outer and inner members defining primary chambers therebetween, the primary chambers comprising at least one first primary chamber arranged to decrease in volume upon relative rotation of the outer and inner members in one sense and at least one second primary chamber arranged to increase in volume in response to said rotation,
   (c) a damping liquid in the primary chambers,
   (d) means defining secondary chambers, the secondary chambers comprising first and second secondary chambers,
   (e) resilient means arranged in each one of the secondary chambers to exert no torque on the outer and inner members, and
   (f) passages connecting each one of the first the primary and secondary chambers, on the one hand, and each one of the second primary and secondary chambers, on the other hand, for permitting the liquid to flow from the primary chambers to the secondary chambers for applying liquid pressure to the resilient means in the secondary chambers.

2. The tuned absorber for torsional vibrations with hydrostatic damping of claim 1, wherein the secondary chambers are disposed radially inwardly of the primary chambers and adjoining the inner member.

3. The tuned absorber for torsional vibrations with hydrostatic damping of claim 2, further comprising means defining a reservoir for the liquid disposed radially inwardly on the secondary chambers and liquid flow control means connected between the reservoir and the secondary chambers.

4. The tuned absorber for torsional vibrations with hydrostatic damping of claim 3, wherein the liquid flow control means are throttle valves.

5. The tuned absorber for torsional vibrations with hydrostatic damping of claim 1, wherein the means defining the secondary chambers comprises stationary containers and the connecting means comprises conduits connected to the containers, and further comprising rotary fittings connected between the conduits and the primary chambers.

6. The tuned absorber for torsional vibrations with hydrostatic damping of claim 1, wherein the resilient means comprises disc springs.

7. The tubed absorber for torsional vibrations with hydrostatic damping of claim 1, wherein the resilient means comprises gas cushions.

* * * * *